T. MASUDA.
BEAN HARVESTER.
APPLICATION FILED AUG. 17, 1917.
1,257,269.
Patented Feb. 19, 1918.
4 SHEETS—SHEET 3.
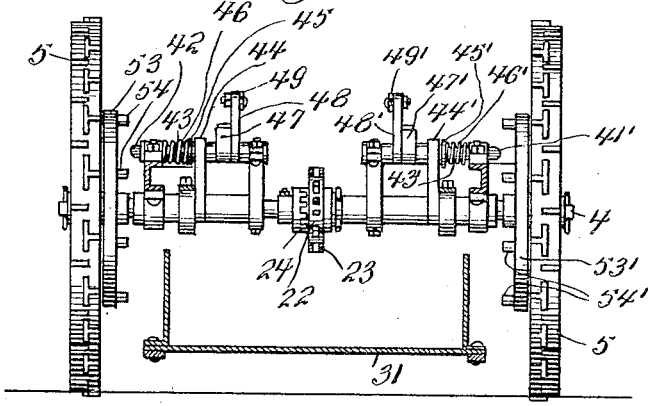
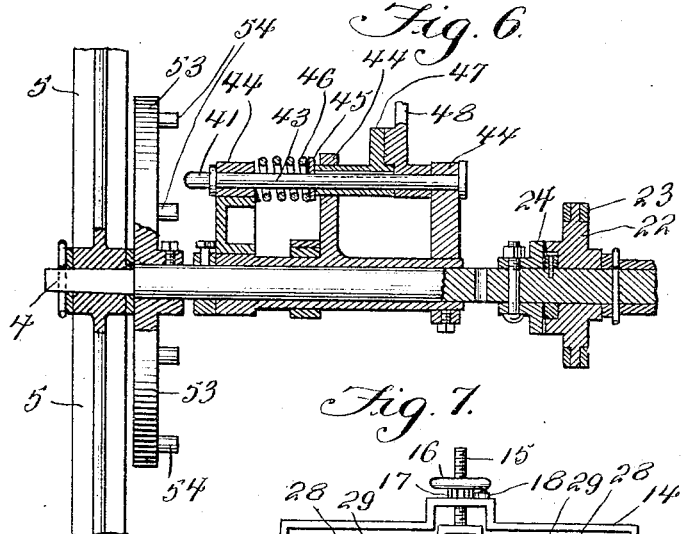
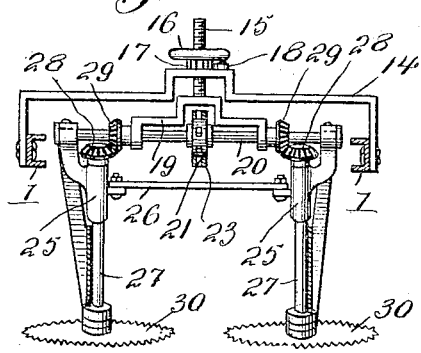
WITNESSES
INVENTOR
Taichiro Masuda
BY Victor J. Evans
ATTORNEY

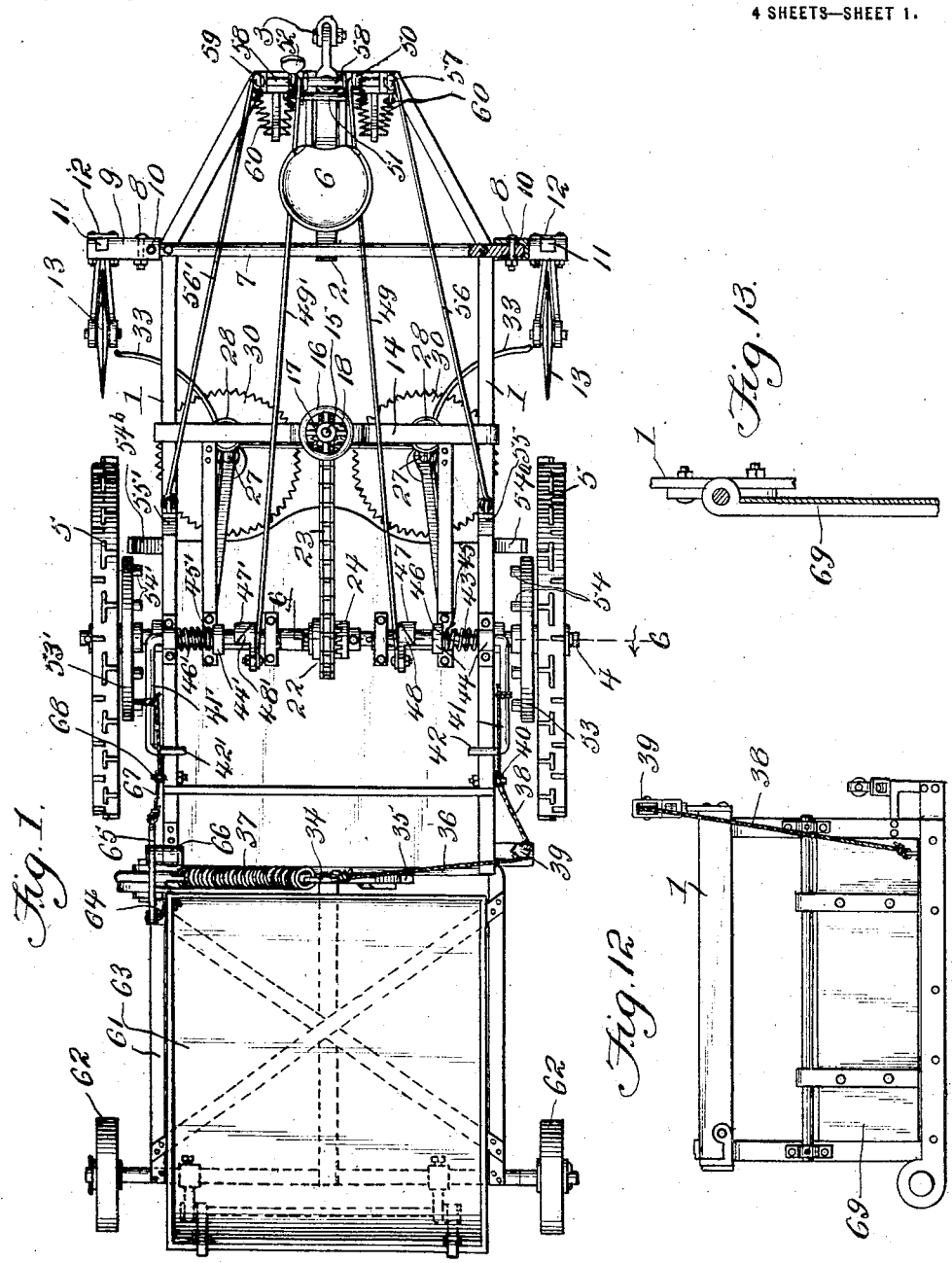

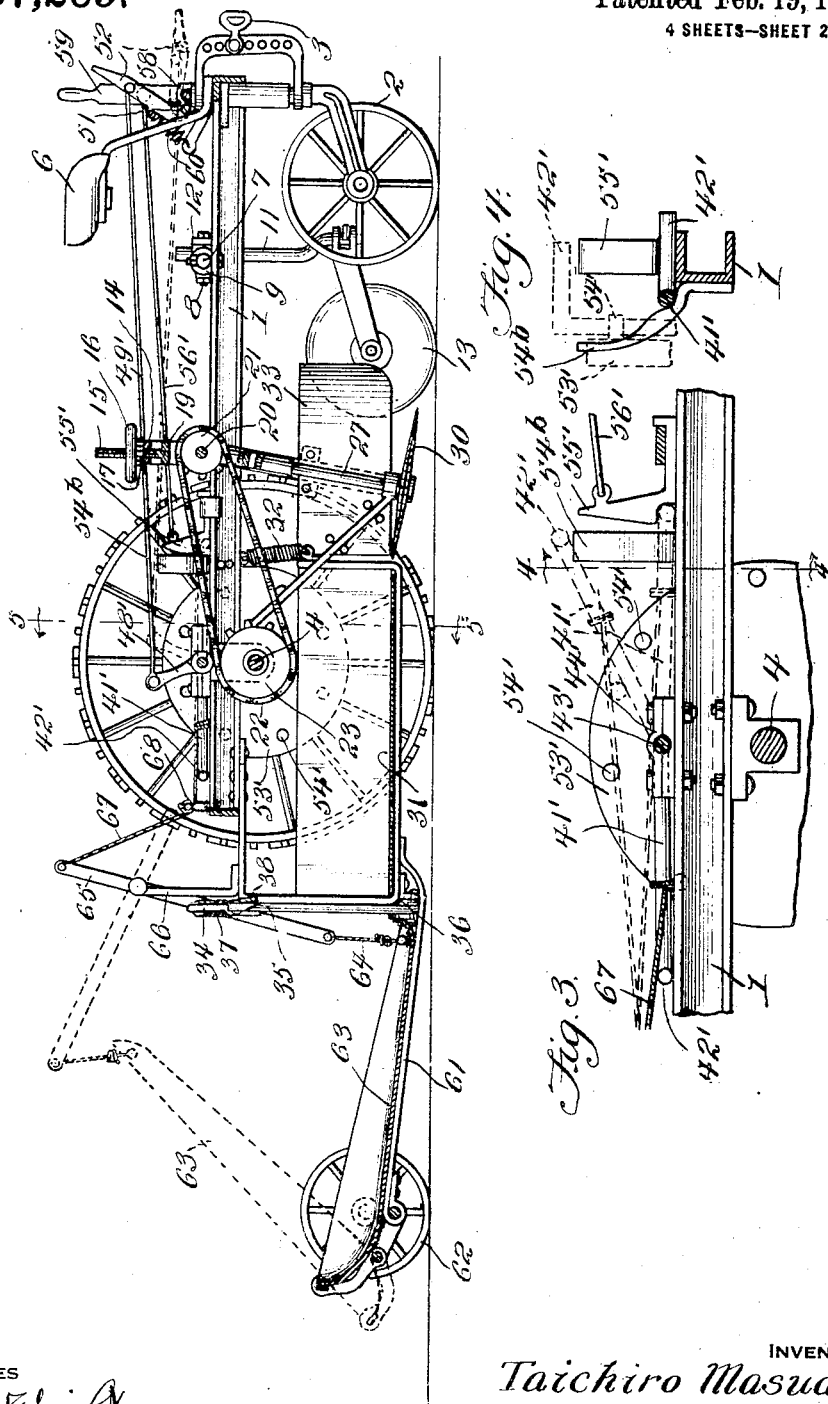

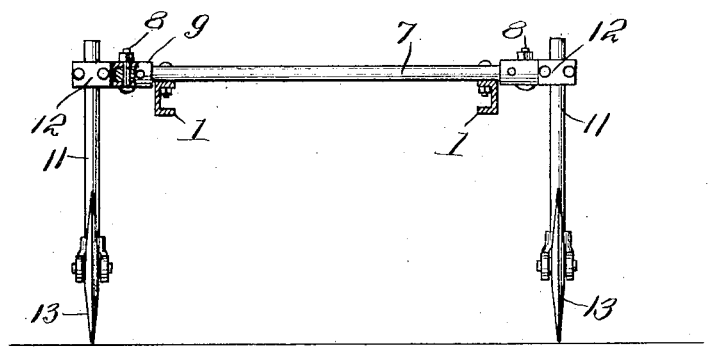
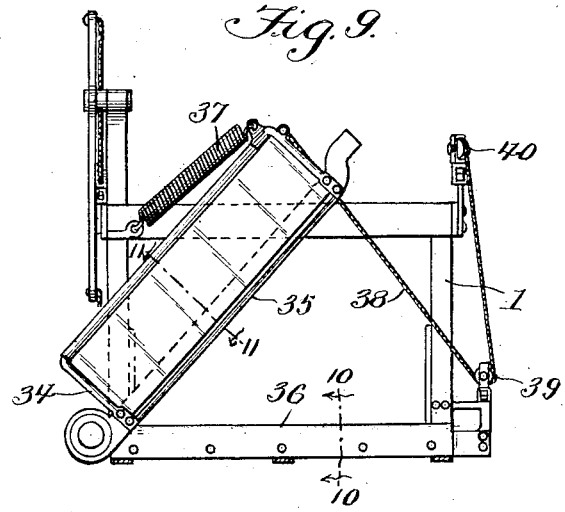
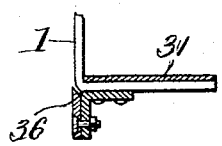
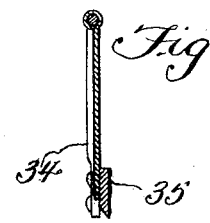

UNITED STATES PATENT OFFICE.

TAICHIRO MASUDA, OF MARYSVILLE, CALIFORNIA.

BEAN-HARVESTER.

1,257,269.　　　　　Specification of Letters Patent.　　Patented Feb. 19, 1918.

Application filed August 17, 1917. Serial No. 186,803.

*To all whom it may concern:*

Be it known that I, TAICHIRO MASUDA, a citizen of Japan, residing at Marysville, in the county of Yuba and State of California, have invented new and useful Improvements in Bean-Harvesters, of which the following is a specification.

This invention relates to harvesters adapted to be used for gathering beans and similar plants and it consists in the novel features hereinafter described and claimed.

An object of the invention is to provide in a combined machine for cutting weeds and plants beyond the sides of the rows of plants which are being harvested, means for severing the plants which are gathered in the vicinity of the surface of the soil, the means being adapted to direct the plants rearwardly. A suitable cradle is pivotally mounted at the rear portion of the frame of the machine and is adapted to receive the vines or plants from the said cutters, there being interposed between the cutters and the said cradle a trough adapted to conduct the plants to the cradle. Also a knife is mounted for vertical movement at the rear edge of the trough and in advance of the forward edge of the cradle and means are provided for swinging the cradle in an upward and rearward direction and for moving the knife in a downward direction whereby the vines or plants are severed or cut at the rear edge of the trough and those which have been conducted into the cradle are deposited upon the surface of the soil in the form of a pile or shock.

In the accompanying drawing:—

Figure 1 is a top plan view of the harvester.

Fig. 2 is a longitudinal sectional view of the same.

Fig. 3 is a fragmentary side elevation of intermediate parts of the same showing parts in section.

Fig. 4 is a transverse sectional view of the parts shown in Fig. 3 cut on the line 4—4 thereof.

Fig. 5 is a transverse sectional view of the harvester cut on the line 5—5 of Fig. 2.

Fig. 6 is an enlarged sectional view of the intermediate portion of the harvester cut on the line 6—6 of Fig. 1.

Fig. 7 is a front elevation of the vine cutting mechanism of the harvester showing adjacent parts in section.

Fig. 8 is a front elevation of the weed cutting mechanism of the harvester showing adjacent parts in section.

Fig. 9 is a rear elevation of the knife which severs the vines at the point of delivery to the cradle and adjacent parts.

Fig. 10 is a detail sectional view of parts shown in Fig. 9 cut on the line 10—10 thereof.

Fig. 11 is a detailed sectional view through the knife shown in Fig. 9 cut on the line 11—11 thereof.

Fig. 12 is a rear elevation of a hinged gate which may be used upon the harvester.

Fig. 13 is a transverse sectional view of the gate shown in Fig. 12.

The bean harvester comprises a frame 1 which is preferably formed from metal and which is supported at its forward end upon a caster wheel 2 of conventional pattern. A clevis 3 is attached to the forward end of the frame 1 in a usual manner. An axle 4 is journaled at the intermediate portion of the frame 1 and wheels 5 are fixed to the end portions of the said axle. An operator's seat 6 is mounted upon the forward portion of the frame 1.

A bar 7 is disposed transversely across the forward portion of the frame 1 and is provided at its end portions and at points beyond the sides of the frame 1 with bolts 8. Sleeves 9 are mounted upon the end portions of the bar 7 and the sleeves are provided with perforations 10 which are disposed at right angles to each other. Standards 11 are adjustably secured to the sleeves 9 by means of plates 12 which in turn are bolted to the sleeve and the said standards carry at their lower ends journaled cutters 13. When the cutters 13 are in operation the standards 11 are vertically disposed and when the cutters 13 are not in operation or in use the standards 11 are horizontally disposed whereby the cutters are held above the surface of the soil. This may be accomplished by removing the sleeve 9 from the ends of the bar 4 and turning them so that the perforations 8 which are at right angles to the axes of the standards 11 may receive the bolts 8. When the machine is in operation the cutters 13 are adapted to cut the weeds and the plants beyond the sides of the rows of plants which are being harvested.

A yoke 14 is supported upon the frame 1 at a point behind the bar 7 and a screw 15 passes transversely through the intermediate portion of the yoke 14. A nut 16 is screwed upon the upper portion of the screw 15 and bears against the upper surface of the yoke 14. The nut 16 is provided at its lower portion with ratchet teeth 17 and a pawl 18 is pivoted upon the yoke 14 and is adapted to engage between the teeth 17 and hold the nut 16 against turning movement. A bracket 19 is carried at the lower end of the screw 15 and a shaft 20 is journaled in the said bracket. A sprocket wheel 21 is mounted upon the shaft 20 and a sprocket wheel 22 is loosely journaled upon the axle 4. A chain 23 is trained around the sprocket wheels 21 and 22 and is adapted to transmit rotary movement from the axle 4 to the shaft 20 when the clutch member 24 which is mounted upon the axle 4 is in engagement with the hub of the sprocket wheel 23. Brackets 25 are mounted upon the end portions of the shaft 20 and are connected together by a cross bar 26. Vertically disposed shafts are journaled in the brackets 25 and are provided at their upper ends with beveled pinions 28 which mesh with similar pinions 29 mounted upon the shaft 20. Cutting blades 30 are carried at the lower ends of the shafts 27 and the blades are provided with serrated cutting edges. As the shaft 20 rotates rotary movement is transmitted to the intermeshing pinions 29 and 28 to the shafts 27 whereby the blades 30 are rotated and the inner portions of the blades turn rearwardly and toward each other, thus as the blades encounter the plants or vines standing in the rows the vines are severed and moved rearwardly by the action of the inner portions of the blades 30.

A trough 31 is carried under the rear portion of the frame 1 and the forward portion of the trough is resiliently supported from the frame by means of coil springs 32 which connect at their lower ends with the trough and at their upper ends with the frame. Thus the trough may readily slide over obstructions which it may encounter. The trough 31 is preferably formed from sheet metal and the frame is provided at its forward end with fenders 33 which extend forwardly above the inner portions of the blades 30 and which lie between the shafts 27. As the machine moves along the ground the fenders 33 encounter the vines and direct them over the inner portions of the blades 30 and the blades encounter the vines and sever the same from the soil or roots and the vines which are thus cut are passed back by the action of the blades 30 and slide along the bottom of the trough 31 toward the rear end thereof.

A frame 34 is pivoted at one end to one side of the frame 1 and at the rear end thereof. The frame 34 carries at its lower edge a knife blade 35. A knife blade 36 is fixed to the rear end of the frame 1 at a point below the rear end of the trough 31 and is adapted to coöperate with the blade 35 hereinbefore mentioned. A coil spring 37 is connected at one end with one of the sides of the frame 1 and is connected at its other end with the free end portion of the frame 34. The spring 37 is under tension with a tendency to normally hold the frame 34 in an elevated position as best shown in Figs. 1 and 9 of the drawings. A cable 38 is attached at one end to the free end of the frame 34 and the intermediate portion of the cable is trained under a pulley 39 which is carried at the lower rear portion of the frame 1. From the pulley 39 the cable 38 is trained over a pulley 40 attached to the upper rear portion of the frame 1 and is then connected with an arm 41 which is turnably mounted at the upper intermediate portion of the frame 1. The arm 41 is provided with angularly disposed end portions 42 and 43, the portion 42 being shorter than the end portion 43. The portion 43 of the arm 41 is journaled in a bearing 44 which is mounted upon the frame 1 and the portion 43 carries a collar 45 which is spaced from the bearing. A spring 46 is interposed between the bearing 44 and the collar 45 and is under tension with a tendency to hold the collar in position away from the bearing. A laterally disposed projection 47 is carried at the inner end of the portion 43 and is adapted to be engaged by a cam 48 which is journaled on an axis in alinement with the axis of the portion 43 of the arm 41. A rod 49 is pivotally connected at its rear end with the cam 48 and is adapted to turn the same when the rod is moved longitudinally. The forward end of the rod 49 is pivotally connected with a crank 50 carried by a shaft 51 which is turnably mounted at the forward portion of the frame 1. The shaft 51 is further provided with a foot pedal 52 which may be used by the occupant of the seat 6 for the purpose of turning the shaft 51. A disk 53 is attached to the hub of the wheel 5 which is adjacent the arm 41 and turns with the said wheel. The disk 53 is provided at its inner sides with a series of inwardly projecting lugs 54 which are spaced from each other.

When the rod 49 is moved longitudinally and the cam 48 is turned its cam surface bears against the projection 47 whereby the portion 43 of the arm 41 is moved longitudinally in an outward direction and the intermediate portion of the said arm 41 is brought into the path of movement of the lugs 54. Therefore as the wheels 5 and disk 53 turn one of the lugs 54 engages the arm 41, turns the arm and swings the same from the rear position as shown in Fig. 1 of the drawing to a position in front of the center of the adjacent wheel 5. This moves the cable 38 longitudinally whereby the free end of the frame 34 is caused to descend against the tension of the spring 37 and the knife 35 is carried down across the cutting edge of the knife 36 and any vines which are between the said knives are severed. An inclined shunt member 54$^a$ is attached to the frame 1 in the path of movement of the arm 41 and when the arm is swung from a rear to a forward position as just described it encounters the shunt member 54$^a$ whereby the arm is moved out of engagement with the lug 54 and at the same time is forced under a resilient catch 55 which is mounted upon the frame 1. A rod 56 is connected at its rear end with the catch 55 and the forward end of the rod 56 is connected with a crank 57 which is carried by a shaft 58 journaled at the forward portion of the frame 1. A lever 59 is fixed to the shaft 58 and may be swung by the occupant of the seat 6. A spring 60 is connected at one end with the lever 59 and at its other end with the frame 1 and is under tension with a tendency to hold the upper end of the lever in a rear position. When the lever 59 is swung in a forward direction the rod 56 is moved longitudinally whereby the catch 55 is withdrawn from over the end portion 42 of the arm 41 and hence the arm 41 may spring rearwardly to the position shown in Fig. 1 under the tension of the spring 37 which is connected with the frame 34 and the frame 1 as shown in Fig. 9 of the drawings.

A frame 61 is connected at its forward end with the lower rear portion of the frame 1 and the rear part of the frame 61 is supported upon wheels 62 which are adapted to travel upon the surface of the ground. A pan 63 is pivotally mounted upon the frame 61 at a point behind the centers of the wheels 62 and the forward portion of the pan 63 is connected by means of a cable 64 with a lever 65 which is pivoted upon a standard 66 mounted upon the frame 1. A cable 67 is connected with the upper end of the lever 65 and the intermediate portion of the said cable 67 is trained under a pulley 68 mounted upon the frame 1 and the forward end of the cable 67 is connected with an arm 41' which is a counter-part of the arm 41 hereinbefore described. In view of the fact that the parts which coöperate with the arm 41' correspond with the parts which coöperate with the arm 41, the corresponding parts in conjunction with the arm 41' are designated by the same characters as the parts coöperating with the arm 41 with the exception that the characters used upon the parts associated with the arm 41' are primed.

In some instances, especially where the vines of the plants are not long or stringy the blades 35 and 36 may be dispensed with and the frame 34 removed from the frame 1, and a gate 69 as shown in Figs. 12 and 13 may be hingedly connected with the frame 1 and operatively connected with the cable 38. Hence when the cable 38 is moved longitudinally the gate 69 is swung to an open position and thus the plants may pass back into the pan 63. When the pan 63 is tilted rearwardly the gate 69 is moved to a closed position and thus the rearward movement of the plants is temporarily interrupted.

From the foregoing description taken in conjunction with the accompanying drawing, it will be seen that a harvester of simple and durable structure is provided and that the same may be used to advantage for harvesting or gathering plants as for instance beans in piles or shocks.

Having described the invention what is claimed is:—

1. A harvester comprising a wheel mounted frame, a pan tiltably mounted behind the frame, means for tilting the pan, a trough carried by the frame, a cutting mechanism arranged between the trough and pan, means for operating the cutting mechanism and manually operable means for simultaneously connecting the pan tilting means and the cutting mechanism operating means with the frame supporting wheels.

2. A harvester comprising a wheel mounted frame, a pan tiltably mounted behind the frame, means for tilting the pan, a cutting blade fixed with relation to the frame, and a blade mounted for swinging movement and coöperating with the first mentioned blade, and means for swinging the last mentioned blade simultaneously with the tilting of the pan.

3. A harvester comprising a wheel mounted frame, a pan tiltably mounted behind the frame, means for tilting the pan, a cutting blade fixed with relation to the frame and located in advance of the pan and in the path thereof, a blade mounted for swinging movement on the frame at the receiving edge of the pan, and means for swinging the last mentioned blade simultaneously with the tilting of the pan.

4. A harvester comprising a wheel mounted frame, a pan tiltably mounted behind the frame, a trough carried by the frame, a cutter located behind the trough, fenders arranged to direct material into the trough and cutting blades located in advance of the trough and adapted to cast material back toward the same.

5. A harvester comprising a wheel mounted frame, a pan mounted behind the frame, a trough carried by the frame, a cutter located at the end of the trough, cutters journaled in advance of the trough and adapted to pass material back into the same, and vertically disposed cutters carried by the frame and located in advance of the cutters which direct the material into the trough.

In testimony whereof I affix my signature.

TAICHIRO MASUDA.

Copies of this patent may be obtained for five cents each, by addressing the "Commissioner of Patents, Washington, D. C."